(12) United States Patent
Sharf

(10) Patent No.: US 9,389,368 B1
(45) Date of Patent: Jul. 12, 2016

(54) RECEPTACLE ASSEMBLY AND SET OF RECEPTACLE ASSEMBLIES FOR A COMMUNICATION SYSTEM

(71) Applicant: Tyco Electronics Corporation, Berwyn, PA (US)

(72) Inventor: Alex Michael Sharf, Harrisburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 14/680,230

(22) Filed: Apr. 7, 2015

(51) Int. Cl.
*G02B 6/36* (2006.01)
*G02B 6/38* (2006.01)
*H01R 12/70* (2011.01)
*H01R 27/02* (2006.01)

(52) U.S. Cl.
CPC ............ *G02B 6/3814* (2013.01); *G02B 6/3825* (2013.01); *G02B 6/3831* (2013.01); *H01R 12/7076* (2013.01); *H01R 27/02* (2013.01)

(58) Field of Classification Search
CPC .. G02B 6/3814; G02B 6/3825; G02B 6/3831; H01R 12/7076
USPC .......................................................... 385/76
See application file for complete search history.

(56) References Cited

U.S. PATENT DOCUMENTS

| | | | | |
|---|---|---|---|---|
| 6,986,679 B1 * | 1/2006 | Aronson | ............... | H01R 25/00 439/170 |
| 8,599,559 B1 * | 12/2013 | Morrison | ........... | H05K 7/20418 361/702 |
| 2008/0039060 A1 * | 2/2008 | Fischer | .................. | H01R 25/00 455/414.4 |
| 2009/0253290 A1 * | 10/2009 | Harris | .................. | G02B 6/4246 439/377 |
| 2012/0021654 A1 * | 1/2012 | Westman | ............. | H01R 12/724 439/682 |
| 2012/0127665 A1 * | 5/2012 | Prete | ......................... | G06F 1/20 361/704 |
| 2012/0207427 A1 * | 8/2012 | Ito | ......................... | G02B 6/4261 385/14 |
| 2014/0153192 A1 * | 6/2014 | Neer | ..................... | H05K 9/0058 361/704 |
| 2014/0321061 A1 * | 10/2014 | Moore | ................... | H05K 3/301 361/709 |
| 2015/0029667 A1 * | 1/2015 | Szczesny | ............ | F28D 15/0275 361/700 |
| 2015/0092354 A1 * | 4/2015 | Kelty | ................ | H05K 7/20563 361/722 |

* cited by examiner

*Primary Examiner* — Sung Pak

(57) ABSTRACT

A receptacle assembly includes a receptacle housing having a module cavity with communication connector positioned in the receptacle housing. The module cavity is oversized to selectively receive a finned pluggable module having a plurality of heat transfer fins and is configured to selectively receive an un-finned pluggable module having a thickness dimension that is smaller than a thickness dimension of the finned pluggable module. The mating interface of the communication connector being selectively matable with both the finned pluggable module and the un-finned pluggable module. Locating features being configured to engage and locate both the finned pluggable module and the un-finned pluggable module depending on which of the finned pluggable module or the un-finned pluggable module is loaded into the module cavity.

20 Claims, 7 Drawing Sheets

US 9,389,368 B1

RECEPTACLE ASSEMBLY AND SET OF RECEPTACLE ASSEMBLIES FOR A COMMUNICATION SYSTEM

BACKGROUND OF THE INVENTION

The subject matter described herein relates to a receptacle assembly that receives a pluggable module in a communication system.

At least some known communication systems include receptacle assemblies, such as input/output (I/O) connector assemblies, that are configured to receive a pluggable module and establish a communicative connection between the pluggable module and an electrical connector of the receptacle assembly. As one example, a known receptacle assembly includes a receptacle housing that is mounted to a circuit board and configured to receive a small form-factor (SFP) pluggable transceiver. The receptacle assembly includes an elongated cavity that extends between an opening of the cavity and an electrical connector that is disposed within the cavity and mounted to the circuit board. The pluggable module is inserted through the opening and advanced toward the electrical connector in the cavity. The pluggable module and the electrical connector have respective electrical contacts that engage one another to establish a communicative connection.

A challenge often encountered in the design of the pluggable module and receptacle assembly is the heat generated during operation of the communication system, which negatively affects module/system reliability and electrical performance. Typically, heat is generated by components on the internal circuit board within the pluggable module and drawn away from the internal circuit board by the metal body of the pluggable module. In some cases, a heat sink that is held by the receptacle assembly housing in direct contact with the metal body of the pluggable module is used to transfer the heat from the pluggable module. Air flowing through and around the receptacle assembly transfers the heat that emanates from the pluggable module. As data throughput speeds of the pluggable modules increase, more heat is generated. Conventional designs are proving to be inadequate for the required heat transfer leading to design of newer pluggable modules having heat fins built into the pluggable modules. Such pluggable modules are typically thicker and are unable to be used with conventional receptacle assemblies due to the size and shape of the pluggable modules with fins. As such, some pluggable modules are unusable with some receptacle assemblies leading manufacturers of communication systems to pick one particular type of module and/or receptacle assembly.

Accordingly, there is a need for a communication system that allows various types of pluggable modules and receptacle assemblies to be interoperable.

BRIEF DESCRIPTION OF THE INVENTION

In an embodiment, a receptacle assembly is provided including a receptacle housing having a module cavity defined by a top wall and opposed side walls extending to a bottom opposite the top wall. The module cavity has a port at a front end of the receptacle housing. The receptacle housing has a locating feature in the module cavity. A communication connector is positioned in the receptacle housing and has a mating interface. The module cavity is oversized and configured to selectively receive a finned pluggable module having a plurality of heat transfer fins extending therefrom and is configured to selectively receive an un-finned pluggable module having a thickness dimension that is smaller than a thickness dimension of the finned pluggable module. The mating interface of the communication connector being selectively matable with both the finned pluggable module and the un-finned pluggable module. The locating features being configured to engage and locate both the finned pluggable module and the un-finned pluggable module depending on which of the finned pluggable module or the un-finned pluggable module is loaded into the module cavity.

In another embodiment, a set of receptacle assemblies is provided including an open airflow receptacle assembly and a heat spreading receptacle assembly. The open airflow receptacle assembly has a first module cavity defined by a top wall and opposed side walls extending to a bottom opposite the top wall. The first module cavity has a first port at a front end thereof. The open airflow receptacle assembly has a locating feature in the module cavity. The open airflow receptacle assembly has a first communication connector positioned in the first module cavity. The heat spreading receptacle assembly includes a second module cavity defined by a top wall and opposed side walls extending to a bottom opposite the top wall. The second module cavity has a second port at a front end thereof. The heat spreading receptacle assembly has a locating feature in the module cavity. The heat spreading receptacle assembly has a second communication connector positioned in the second module cavity. The heat spreading receptacle assembly has a thermal transport in the second module cavity at the top wall configured to dissipate heat. The first module cavity is configured to selectively receive a finned pluggable module having a plurality of heat transfer fins extending therefrom and is configured to selectively receive an un-finned pluggable module. The communication connector in the first module cavity is selectively matable with both the finned pluggable module and the un-finned pluggable module. The locating features of the open airflow receptacle assembly are configured to engage and locate both the finned pluggable module and the un-finned pluggable module depending on which of the finned pluggable module or the un-finned pluggable module is loaded into the first module cavity such that the finned pluggable module or the un-finned pluggable module is located at the bottom of the first module cavity. Air is configured to flow between the top wall of the open airflow receptacle assembly and the finned pluggable module or the un-finned pluggable module. The second module cavity is configured to selectively receive the finned pluggable module and is configured to selectively receive the un-finned pluggable module. The communication connector in the second module cavity is selectively matable with both the finned pluggable module and the un-finned pluggable module. The locating features of the heat spreading receptacle assembly are configured to engage and locate both the finned pluggable module and the un-finned pluggable module depending on which of the finned pluggable module or the un-finned pluggable module is loaded into the second module cavity such that the finned pluggable module or the un-finned pluggable module is located at the bottom of the second module cavity. The heat transfer fins of the finned pluggable module are configured to be in intimate thermal communication with the thermal transport such that the thermal transport draws heat from the finned pluggable module to cool the finned pluggable module. The un-finned pluggable module fits in the second module cavity below the thermal transport when the un-finned pluggable module is loaded into the second module cavity.

In a further embodiment, a communication system is provided including a circuit board having a mounting surface, an open airflow receptacle assembly, a heat spreading receptacle assembly, a finned pluggable module and an un-finned pluggable module. The open airflow receptacle assembly is configured to be mounted to the mounting surface of the circuit board. The open airflow receptacle assembly includes a first module cavity defined by a top wall and opposed side walls extending to a bottom opposite the top wall. The first module cavity has a first port at a front end thereof. The open airflow receptacle assembly has a locating feature in the module cavity. The open airflow receptacle assembly has a first communication connector positioned in the first module cavity. The heat spreading receptacle assembly is configured to be mounted to the mounting surface of the circuit board. The heat spreading receptacle assembly includes a second module cavity defined by a top wall and opposed side walls extending to a bottom opposite the top wall. The second module cavity has a second port at a front end thereof. The heat spreading receptacle assembly has a locating feature in the module cavity. The heat spreading receptacle assembly has a second communication connector positioned in the second module cavity. The heat spreading receptacle assembly has a thermal transport in the second module cavity at the top wall. The thermal transport is configured to dissipate heat. The finned pluggable module includes a finned pluggable body extending between a mating end and a cable end. The finned pluggable module has an internal circuit board exposed at the mating end. The finned pluggable body has a first end and an opposite second end with sides extending therebetween along a length of the pluggable body. The finned pluggable body has a plurality of fins extending outward from the first end. The un-finned pluggable module includes a smooth pluggable body extending between a mating end and a cable end. The un-finned pluggable module has an internal circuit board exposed at the mating end. The un-finned pluggable body has a first end and an opposite second end with sides extending therebetween along a length of the pluggable body. The un-finned pluggable body has a thickness thinner than a thickness of the finned pluggable module. The open airflow receptacle assembly and the heat spreading receptacle assembly are selectively mounted to the mounting surface of the circuit board such that a) one or more open airflow receptacle assembly are mounted to the circuit board; b) one or more heat spreading receptacle assembly are mounted to the circuit board; or c) at least one open airflow receptacle assembly and at least one heat spreading receptacle assembly are mounted to the circuit board. The open airflow receptacle assembly is configured to selectively receive the finned pluggable module and is configured to selectively receive the un-finned pluggable module. The heat spreading receptacle assembly is configured to selectively receive the finned pluggable module and is configured to selectively receive the un-finned pluggable module.

DETAILED DESCRIPTION OF THE INVENTION

Embodiments set forth herein include communication systems including a family of connectors that are interoperable and interconnectable. The communication system includes sets of receptacle assemblies and sets of pluggable modules that are interoperable. For example, the communication system may include a set of two or more different types of receptacle assemblies. The communication system may include a set of two or more different types of pluggable modules.

Various embodiments described herein include receptacle assemblies having different characteristics or features, but each of the receptacle assemblies is able to receive the different types of pluggable modules therein. Similarly, the pluggable modules have different characteristics or features, but each of the pluggable modules is configured to be received in each of the various types of receptacle assemblies. For example, in an exemplary embodiment, the communication system includes both finned pluggable modules having heat transfer fins and un-finned pluggable modules being devoid of heat transfer fins. While the finned pluggable modules may be larger or thicker than the un-finned pluggable modules, both the finned pluggable modules and the un-finned pluggable modules are configured to be received in the different types of receptacle assemblies.

In various embodiments described herein the communication system includes both an open airflow receptacle assembly and a heat spreading receptacle assembly. The heat spreading receptacle assembly includes a heat spreading element therein configured to be in thermal communication with the pluggable module received therein to transfer heat therefrom. The open airflow receptacle assembly is devoid of the extra heat spreading element, but rather has an open cavity above the corresponding pluggable module to allow airflow above such pluggable module. Both the open airflow receptacle assembly and the heat spreading receptacle assembly are configured to receive both finned pluggable modules and un-finned pluggable modules.

Figure 1:
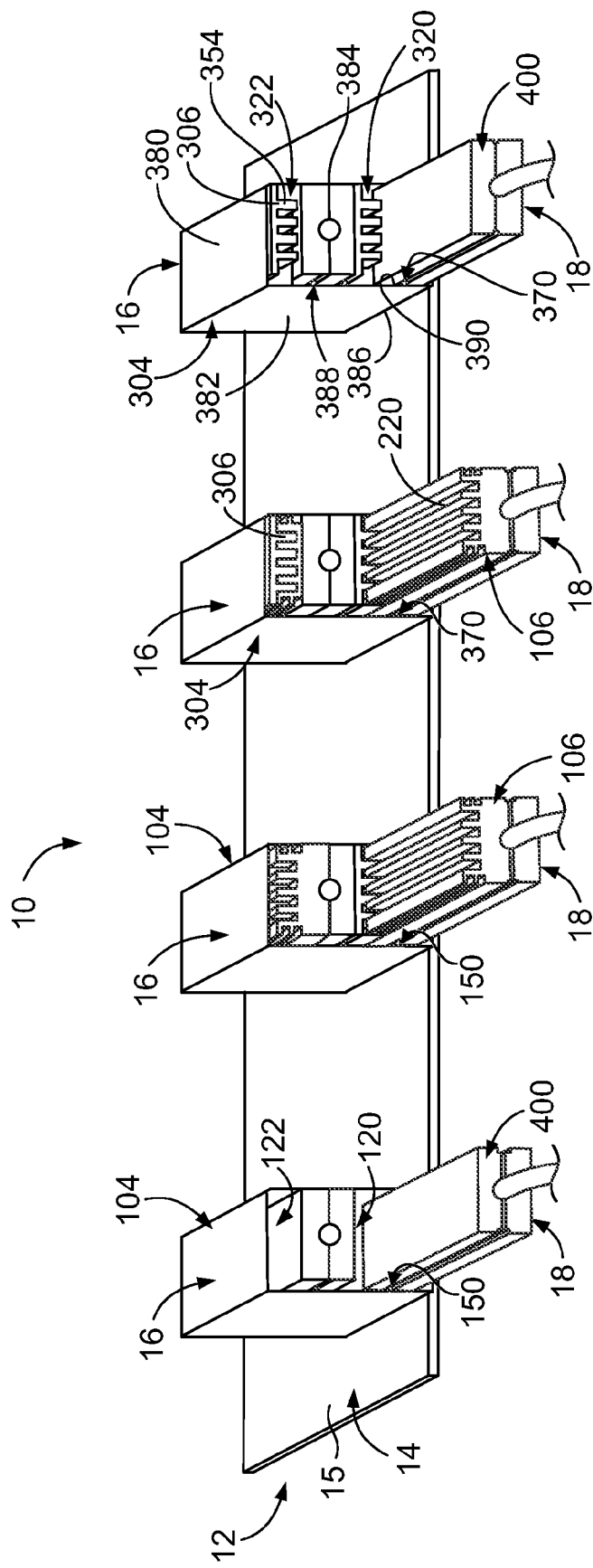
FIG. 1 is a schematic illustration of a communication system in accordance with an exemplary embodiment showing a family of connectors.

FIG. 1 is a schematic illustration of a communication system 10 in accordance with an exemplary embodiment showing a family of connectors 12. The connectors 12 are configured to be electrically connected to a circuit board 14. The family of connectors 12 includes various receptacle assemblies 16 and various pluggable modules 18. Any of the various types of receptacle assemblies 16 may be mounted to the circuit board 14. Any of the various types of pluggable modules 18 may be received in and electrically connected to any one of the receptacle assemblies 16.

While FIG. 1 illustrates the communication system 10 with two different types of receptacle assemblies 16 mounted to the same circuit board 14, any number of different types of receptacle assemblies 16 may be used. In some embodiments, the communication system 10 may be assembled such that only one type of receptacle assembly 16 is mounted to the circuit board 14 at a time. In other embodiments, the communication system 10 may be assembled such that more than one type of receptacle assembly 16 are mounted to the circuit board 14 at the same time. The receptacle assemblies 16 may be stacked receptacle assemblies configured to hold pluggable modules in a stacked arrangement. The receptacle assemblies 16 may be ganged receptacle assemblies configured to hold pluggable modules side-by-side. For example, the receptacle assemblies 16 may be immediately adjacent to each other without a gap or space therebetween.

While FIG. 1 illustrates the communication system 10 with two different types of pluggable modules 18 received in the various receptacle assemblies 16, any number of different types of pluggable modules 18 may be used. In some embodiments, the communication system 10 may be assembled such that only one type of pluggable module 18 is utilized and loaded into corresponding receptacle assemblies 16. In other embodiments, the communication system 10 may be assembled such that more than one type of pluggable module 18 are plugged into the corresponding receptacle assemblies 16.

In the illustrated embodiment, the communication system 10 includes finned pluggable modules 106, un-finned pluggable modules 400, open airflow receptacle assemblies 104, and heat spreading receptacle assemblies 304. Other types of pluggable modules and/or receptacle assemblies may be used as part of the communication system 10 in alternative embodiments.

The finned pluggable modules 106 include a plurality of heat transfer fins 220 extending from a body of the finned pluggable module 106. The heat transfer fins 220 increase the surface area of the finned pluggable module 106 for greater heat transfer therefrom as compared to the un-finned pluggable modules 400. In an exemplary embodiment, the finned pluggable modules 106 may be used for high-power applications, which generate more heat as compared to low-power applications, and the un-finned pluggable modules 400 may be used for low-power applications. The finned pluggable modules 106 may be used in applications where more heat dissipation from the pluggable modules is desired. The heat transfer fins 220, in the illustrated embodiment, extend from a top of the finned pluggable module, which increases the height or thickness of the finned pluggable module 106 as compared to the un-finned pluggable module 400; however heat transfer fins may additionally or alternatively extend from the bottom and/or the sides of the pluggable module. In an exemplary embodiment, both the open airflow receptacle assemblies 104 and the heat spreading receptacle assemblies 304 are sized and configured to receive the smaller un-finned pluggable modules 400 and the larger finned pluggable modules 106. Optionally, an airflow gap may be provided under the pluggable modules in addition to above the pluggable modules.

The heat spreading receptacle assemblies 304 include thermal transports 306 in the module cavity defined by the walls of the receptacle assemblies 304. While the thermal transports 306 are illustrated along the top, the thermal transports may be located in any location, such as along the bottom, the sides or elsewhere. The thermal transports 306 have rails 354 that increase the surface area of the thermal transports 306 for greater heat transfer to the thermal transports 306. The thermal transports 306 are configured to be in intimate thermal communication with the corresponding pluggable modules 106, 400 received in the receptacle assemblies 304. Optionally, the thermal transports 306 may be in direct thermal contact with an exterior surface of the corresponding pluggable module 106, 400. In other embodiments, the thermal transports 306 may be in close proximity to the corresponding pluggable module 106, 400 to receive heat dissipated therefrom. Optionally, a thermal interface material may be provided between the thermal transports 306 and the corresponding pluggable modules 106, 400 for heat transfer therebetween. When one of the finned pluggable modules 106 is received in the heat spreading receptacle assembly 304, the rails 354 are positioned between corresponding heat transfer fins 220. The rails 354 may directly engage corresponding adjacent heat transfer fins 220 to transfer heat between the finned pluggable module 106 and the thermal transport 306. When one of the un-finned pluggable modules 400 is received in the heat spreading receptacle assembly 304, the un-finned pluggable module 400 is positioned below distal ends of the rails 354. The thermal transports 306 do not interfere with loading or unloading of the un-finned pluggable module 400 into the heat spreading receptacle assembly 304.

The open airflow receptacle assemblies 104 do not include thermal transports, but rather have an open airflow channel in the module cavity above the pluggable modules 106, 400. The open airflow channel may be open to the exterior environment forward of the receptacle assemblies 104 to allow airflow between the exterior environment and the module cavity. Airflow in the open channel facilitates heat transfer, such as for cooling of the pluggable modules 106, 400; however it is possible in some embodiments that the heat transfer may be used to heat to the pluggable modules 106, 400, such as in a cold environment. When one of the finned pluggable modules 106 is received in the open airflow receptacle assembly 104, the heat transfer fins 220 may extend into the open airflow channel such that air flowing in such channel flows along the heat transfer fins 220 to dissipate heat from the pluggable module 106. When one of the un-finned pluggable modules 400 is received in the open airflow receptacle assembly 104, air flowing in the open channel flows along the top of the pluggable module 400 to dissipate heat from the pluggable module 400.

The connectors 12 of the family of connectors 12 are interoperable. The manufacturer or assembler of the communication system 10 may choose either or both type of receptacle assembly 104, 304 and install such receptacle assembly 104, 304 on the circuit board 14. The customer or user of the communication system 10 may likewise choose either or both type of pluggable module 106, 400 and connect such pluggable module 106, 400 with whichever receptacle assembly 104, 304 is utilized. Such interoperability provides the manufacturer or assembler of the communication system 10 flexibility in designing and assembling the communication system 10.

Figure 2:
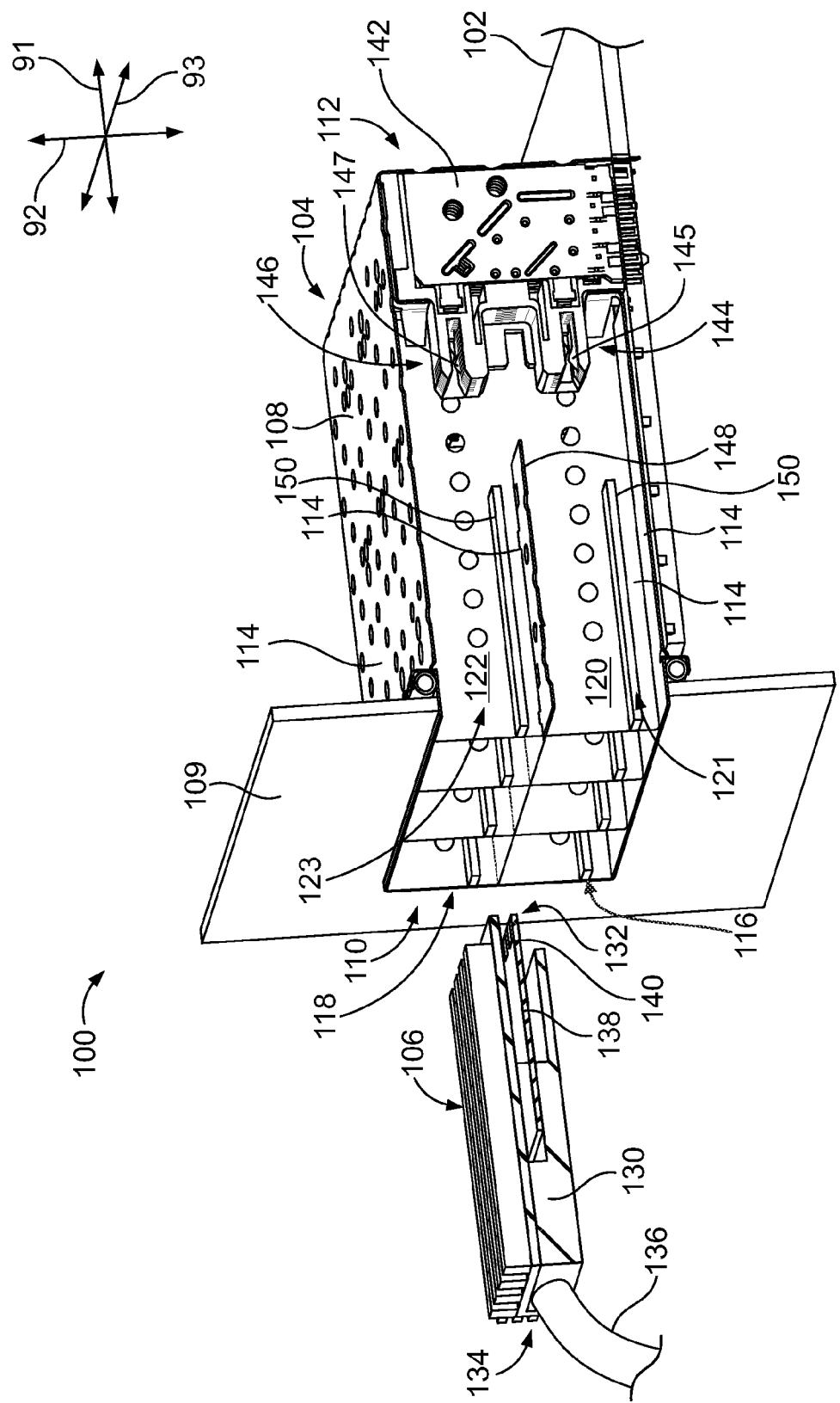
FIG. 2 is a perspective cross-sectional view of a communication system in accordance with an embodiment.

FIG. 2 is a perspective cross-sectional view of a communication system 100 in accordance with an embodiment. The communication system 100 is a variation of the communication system 10 utilizing the finned pluggable modules 106 and open airflow receptacle assemblies 104.

The communication system 100 may include a circuit board 102, one or more of receptacle assembly 104 mounted to the circuit board 102, and one or more pluggable modules 106 that are configured to communicatively engage the receptacle assembly 104. The receptacle assembly 104 is illustrated as a stacked and ganged receptacle assembly 104 configured to receive multiple pluggable modules 106 in stacked and ganged arrangements. The receptacle assembly 104 is illustrated as an open airflow receptacle assembly. While only one pluggable module 106 is shown in FIG. 1, it is understood that multiple pluggable modules 106 may simultaneously engage the receptacle assembly 104. Un-finned pluggable modules 400 (shown in FIG. 1) may be plugged into the receptacle assembly 104 in alternative embodiments.

The communication system 100 is oriented with respect to a mating or insertion axis 91, an elevation axis 92, and a lateral axis 93. The axes 91-93 are mutually perpendicular. Although the elevation axis 92 appears to extend in a vertical direction parallel to gravity in FIG. 1, it is understood that the axes 91-93 are not required to have any particular orientation with respect to gravity. For example, the circuit board 102 may be oriented vertically, horizontally, or in another orientation.

The communication system 100 may be part of or used with telecommunication systems or devices. For example, the communication system 100 may be part of or include a switch, router, server, hub, network interface card, or storage system. In the illustrated embodiment, the pluggable module 106 is configured to transmit data signals in the form of electrical signals. In other embodiments, the pluggable module 106 may be configured to transmit data signals in the form of optical signals. The circuit board 102 may be a daughter card or a mother board and include conductive traces (not shown) extending therethrough.

The receptacle assembly 104 includes a receptacle housing 108 that is mounted to the circuit board 102. The receptacle housing 108 may also be referred to as a receptacle cage. The receptacle housing 108 may be arranged at a bezel or faceplate 109 of a chassis of the system or device, such as through an opening in the faceplate 109. As such, the receptacle housing 108 is interior of the device and corresponding faceplate 109 and the pluggable module(s) 106 is loaded into the receptacle housing 108 from outside or exterior of the device and corresponding faceplate 109. In the illustrated embodiment, the receptacle assembly 104 is provided without any thermal transports or other thermal components inserted therein, instead leaving an open airflow channel above the pluggable module 106. In other various embodiments, the receptacle assembly 104 may include a thermal transport therein used to transport heat from the receptacle assembly 104 and/or from the pluggable module 106, thus defining a heat spreading receptacle assembly.

The receptacle housing 108 includes a front end 110 and an opposite back end 112. The front end 110 may be provided at, and extend through an opening in, the faceplate 109. The mating axis 91 may extend between the front and back ends 110, 112. Relative or spatial terms such as "front," "back," "top," or "bottom" are only used to distinguish the referenced elements and do not necessarily require particular positions or orientations in the communication system 100 or in the surrounding environment of the communication system 100. For example, the front end 110 may be located in or facing a back portion of a larger telecommunication system. In many applications, the front end 110 is viewable to a user when the user is inserting the pluggable module 106 into the receptacle assembly 104. In other examples, the top and bottom may be referenced to the circuit board 102 with the bottom positioned closer to the circuit board and the top positioned further from the circuit board. The top may be positioned below the bottom in some orientations and the top and bottom may be vertically aligned in some orientations, such as when the circuit board 102 is oriented vertically as opposed to horizontally.

The receptacle housing 108 is configured to contain or block electromagnetic interference (EMI) and guide the pluggable module(s) 106 during a mating operation. To this end, the receptacle housing 108 includes a plurality of housing walls 114 that are interconnected with one another to form the receptacle housing 108. The housing walls 114 may be formed from a conductive material, such as sheet metal and/or a polymer having conductive particles. In the illustrated embodiment, the housing walls 114 are stamped and formed from sheet metal. In some embodiments, the receptacle housing 108 is configured to facilitate airflow through the receptacle housing 108 to transfer heat (or thermal energy) away from the receptacle assembly 104 and pluggable module(s) 106. The air may flow from inside the receptacle housing 108 (for example, behind the faceplate 109) to the external environment (for example, forward of the faceplate 109) or from outside the receptacle housing 108 into the interior of the receptacle housing 108. Fans or other air moving devices may be used to increase airflow through the receptacle housing 108 and over the pluggable module(s) 106.

In the illustrated embodiment, the receptacle housing 108 includes a first (or bottom) row 116 of elongated module cavities 120 and a second (or top) row 118 of elongated module cavities 122. Each of the module cavities 120, 122 extends between the front and back ends 110, 112. The module cavities 120, 122 have respective port openings 121, 123 that are sized and shaped to receive a corresponding pluggable module 106. The module cavities 120, 122 may have the same or similar dimensions and extend lengthwise in a direction that is parallel to the mating axis 91. In the illustrated embodiment, each module cavity 122 is stacked over a corresponding module cavity 120 such that the module cavity 120 is positioned between the module cavity 122 and the circuit board 102. Any number of module cavities may be provided including a single module cavity. The module cavities 120, 122 may be oversized to accommodate different sized pluggable modules, such as pluggable modules having different thicknesses. For example, the module cavities 120, 122 may be oversized to accommodate both finned pluggable modules and un-finned pluggable modules.

In some embodiments, the pluggable module 106 is an input/output cable assembly having a pluggable body 130. The pluggable body 130 includes a mating end 132 and an opposite cable end 134. A cable 136 is coupled to the pluggable body 130 at the cable end 134. The pluggable body 130 also includes an internal circuit board 138 that is communicatively coupled to electrical wires or optical fibers (not shown) of the cable 136. The internal circuit board 138 includes contact pads 140 at the mating end 132. In FIG. 1, the mating end 132 is configured to be inserted into the module cavity 122 of the receptacle housing 108 and advanced in a mating direction along the mating axis 91. In an exemplary embodiment, the pluggable body 130 provides heat transfer for the internal circuit board 138, such as for the electronic components on the internal circuit board 138. For example, the internal circuit board 138 is in thermal communication with the pluggable body 130 and the pluggable body 130 transfers heat from the internal circuit board 138.

The receptacle assembly 104 includes a communication connector 142 having first and second mating interfaces 144, 146. The first mating interface 144 is disposed within the module cavity 120, and the second mating interface 146 is disposed within the module cavity 122. The first and second mating interfaces 144, 146 are aligned with the port openings 121, 123, respectively. Each of the first and second mating interfaces 144, 146 includes respective electrical contacts 145, 147 that are configured to directly engage the contact pads 140 of the pluggable module 106. Thus, a single communication connector 142 may mate with two pluggable modules 106.

In alternative embodiments, the receptacle assembly 104 does not include the stacked module cavities 120, 122 and, instead, includes only a single row of module cavities 120 or only a single module cavity 120. In such embodiments, the communication connector 142 may have a single row of mating interfaces or a single mating interface.

The pluggable module 106 is an input/output (I/O) module configured to be inserted into and removed from the receptacle assembly 104. In some embodiments, the pluggable module 106 is a small form-factor pluggable (SFP) transceiver or quad small form-factor pluggable (QSFP) transceiver. The pluggable module 106 may satisfy certain technical specifications for SFP or QSFP transceivers, such as Small-Form Factor (SFF)-8431. In some embodiments, the pluggable module 106 is configured to transmit data signals up to 2.5 gigabits per second (Gbps), up to 5.0 Gbps, up to 10.0 Gbps, or more. By way of example, the receptacle assembly 104 and the pluggable module 106 may be similar to the receptacle cages and transceivers, respectively, which are part of the SFP+ product family available from TE Connectivity.

In various embodiments, the housing walls 114 of the receptacle housing 108 may optionally form a separator plate 148 between the module cavities 120, 122. The separator plate 148 extends generally parallel to the mating axis 91 between the front end 110 and the back end 112. More specifically, the module cavity 120, the separator plate 148, and the module cavity 122 are stacked along the elevation axis 92. In the illustrated embodiment, the separator plate 148 is a single wall panel separating the module cavities 120, 122. In alternative embodiments, the separator plate may be U-shaped having parallel wall panels separated by a separator cavity. Optionally, a light-indicator assembly (not shown), such as a light pipe may be provided in the separator cavity defined by the separator plate 148. The separator cavity may allow airflow between the module cavities 120, 122 to enhance heat transfer of the pluggable modules 106 located in the module cavities 120, 122.

In an exemplary embodiment, the receptacle housing 108 of the receptacle assembly 104 includes one or more locating features 150 in the module cavities 120, 122. The locating features 150 are used to locate the pluggable modules 106 in the module cavities 120, 122. In the illustrated embodiment, the locating features 150 are flanges or rails extending into the module cavities 120, 122. Other types of locating features such as, but limited to walls, tabs, wedges, keys, keyways, slots, grooves, spring beams and the like, may be used in alternative embodiments. The pluggable modules 106 include locating features 152 (shown in FIG. 4) that interact with the locating features 150 to locate the pluggable modules 106 in the module cavities 120, 122. In the illustrated embodiment, the locating features 152 are slots and may be referred to hereinafter as slots 152 (shown in FIG. 4). The slots 152 receive the locating features 150. Other types of locating features such as, but limited to rails, tabs, wedges, keys, keyways, spring beams and the like, may be used in alternative embodiments. In other various embodiments, the fins 220 may define the locating features 152. For example, the fins 220 may ride along the top of the corresponding module cavity 120, 122 to locate the pluggable module 106 in the module cavity 120, 122. In such embodiments, rather than having the rails 150 extending into the module cavities 120, 122, the separator plate or top housing wall at the top of the module cavity 120, 122, respectively, defines the locating features 150 in the module cavities 120, 122. The locating features 150 control positions of the pluggable modules 106 relative to the housing walls 114 and relative to the communication connector 142. The locating features 150 may be used to align the mating interfaces of the pluggable modules 106 at the mating ends 132 with the mating interfaces 144, 146 of the communication connector 142. As such, irrespective of the pluggable module being a finned pluggable module or an un-finned pluggable module, the locating features 150 may control the positions of such pluggable modules in the module cavities 120, 122.

Figure 3:
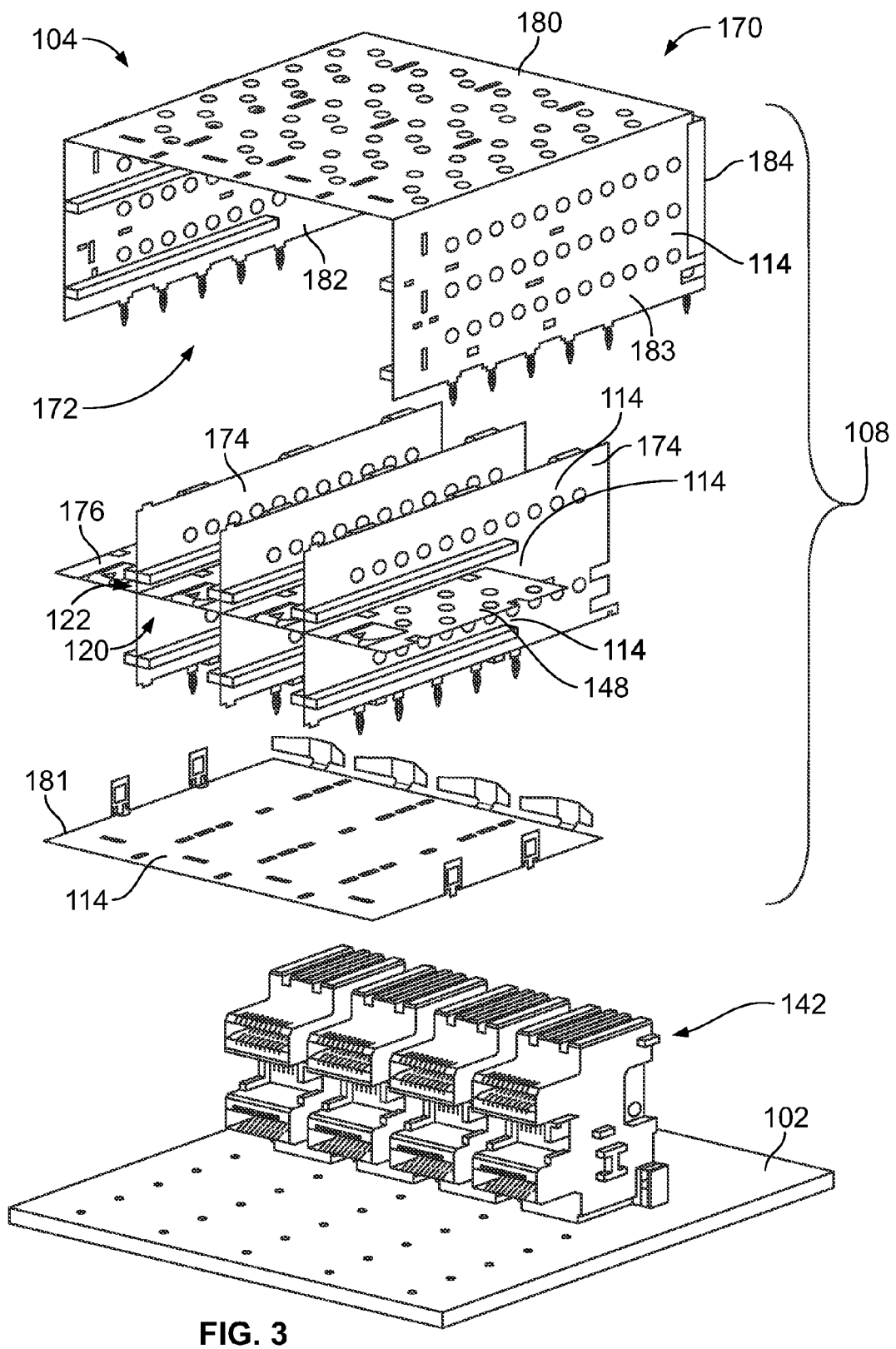
FIG. 3 is a partially exploded view of a receptacle assembly of the communication system shown in FIG. 2.

FIG. 3 is a partially exploded view of the receptacle assembly 104 and illustrates the receptacle housing 108 and a plurality of the communication connectors 142 mounted to the circuit board 102. In some embodiments, the receptacle housing 108 is formed from a plurality of interconnected panels or sheets. For example, the receptacle housing 108 includes a main panel or shell 170 that surrounds a housing cavity 172, a plurality of interior panels 174, a base panel 181, and one or more separator panels 176 defining the separator plate 148. Each of the main panel 170, the interior panels 174, and the separator panels 176 may be stamped and formed from sheet metal. As described in greater detail below, each of the main panel 170, the interior panels 174, and the separator panels 176 may form one or more of the housing walls 114 that define the module cavity 120, the module cavity 122, and the separator plate 148 as shown in FIG. 1. As shown in FIG. 3, the main panel 170 includes an elevated wall 180, sidewalls 182, 183, and a back wall 184. The elevated wall 180 is located furthest from the circuit board 102, such as at the top of the receptacle assembly 104, and may thus define a top wall 180 of the module cavity 122, when the receptacle assembly 104 is constructed. The separator panel 176 may define a bottom or bottom wall of the module cavity 122. The separator panel 176 may define a top wall 176 of the module cavity 120. The base panel 181 may rest on the circuit board 102, and may thus define a bottom 181 or bottom wall 181 of the receptacle assembly 104. In alternative embodiments, the circuit board 102 may define the bottom as opposed to using the base panel 181. The sidewalls 182, 183 and the back wall 184 are configured to extend from the circuit board 102, when mounted thereto, to the elevated wall 180.

The interior panels 174 and the separator panels 176 are configured to be positioned within the housing cavity 172. Within the main panel 170, the interior panels 174 and the separator panels 176 apportion or divide the housing cavity 172 into the separate module cavities 120, 122 (FIG. 1).

The main panel 170, the base panel 181, the interior panels 174, and the separator panels 176 may comprise conductive material, such as metal or plastic. When the receptacle housing 108 is mounted to the circuit board 102, the receptacle housing 108 and the receptacle assembly 104 are electrically coupled to the circuit board 102 and, in particular, to ground planes (not shown) within the circuit board 102 to electrically ground the receptacle housing 108 and the receptacle assembly 104. As such, the receptacle assembly 104 may reduce EMI leakage that may negatively affect electrical performance of the communication system 100 (FIG. 1).

Figure 4:
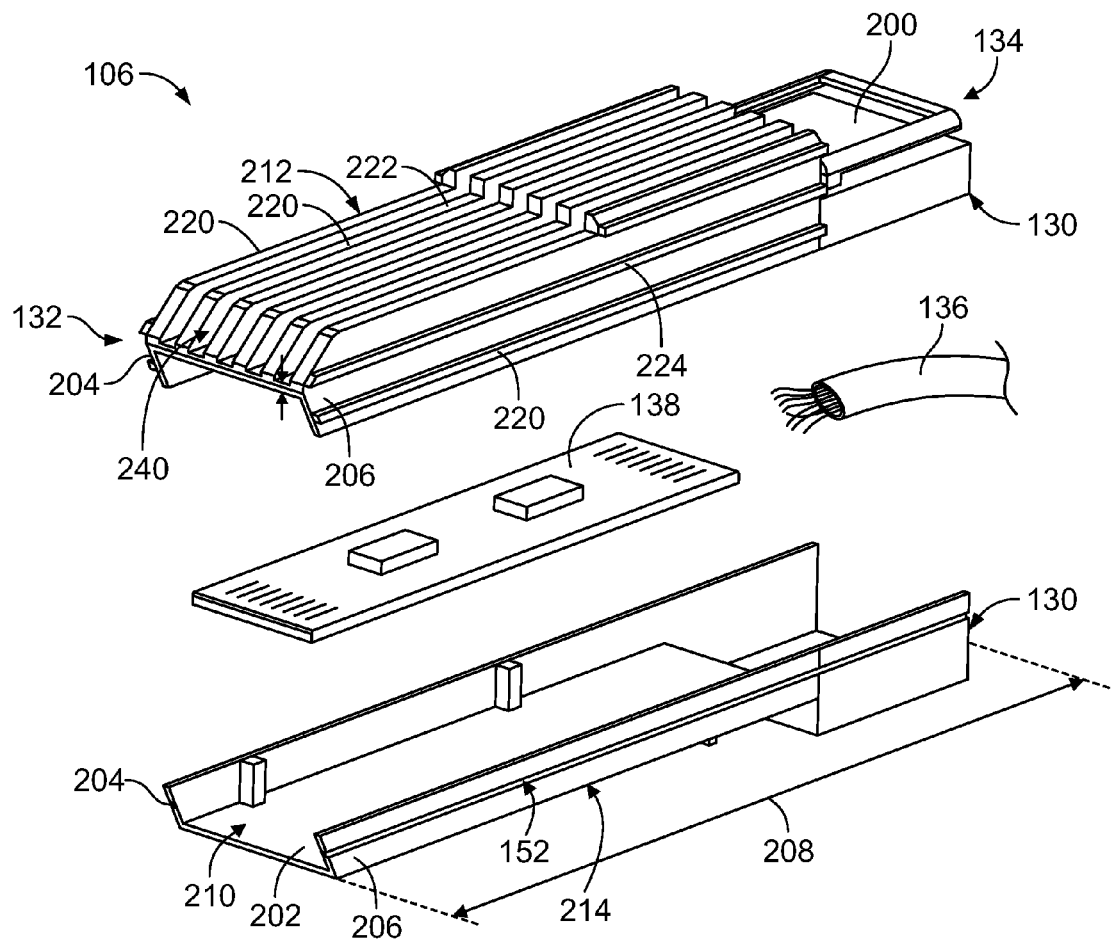
FIG. 4 is an exploded view of a pluggable module of the communication system formed in accordance with an exemplary embodiment.
Figure 5:
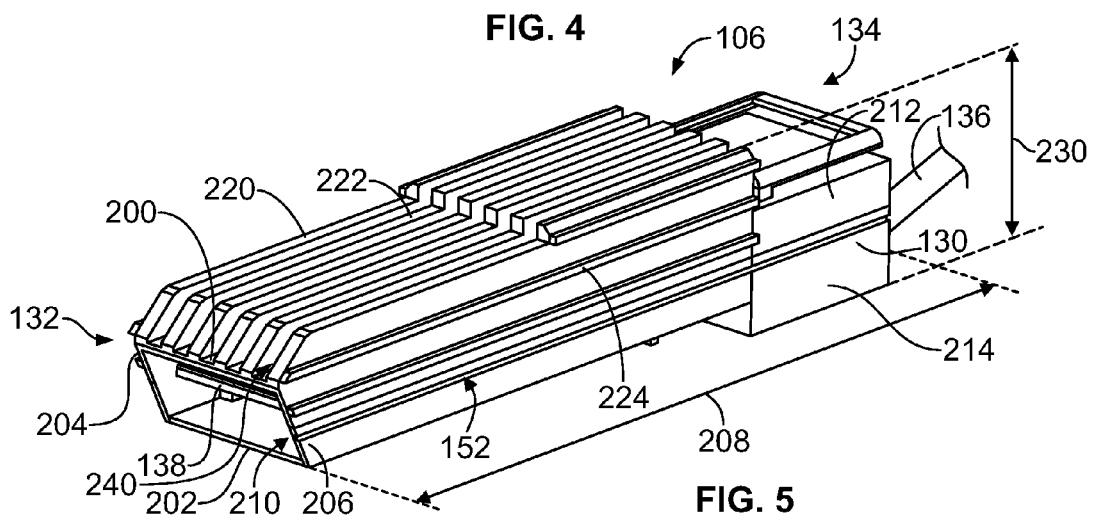
FIG. 5 is a front perspective view of the pluggable module shown in FIG. 4.

FIG. 4 is an exploded view of the pluggable module 106 in accordance with an exemplary embodiment. FIG. 5 is a front perspective view of the pluggable module 106 in accordance with an exemplary embodiment. The pluggable module 106 is illustrated as a finned pluggable module and may be referred to hereinafter as finned pluggable module 106. The pluggable body 130 holds the internal circuit board 138. The pluggable body 130 has a first end or top end 200 and an opposite second end or bottom end 202 with sides 204, 206 extending between the first and second ends 200, 202. The first and second ends 200, 202 and the sides 204, 206 extend lengthwise along a length 208 of the pluggable body 130 between the mating end 132 and cable end 134. The first end 200, second end 202 and sides 204, 206 define a cavity 210 that holds the internal circuit board 138. The cable 136 may extend into the cavity 210 for connection with the internal circuit board 138. Optionally, the internal circuit board 138 may be exposed at the mating end 132 for mating with the corresponding communication connector 142 (shown in FIG. 2).

In an exemplary embodiment, the pluggable body 130 includes a first shell 212 and a second shell 214. Optionally, the first shell 212 may define an upper shell and may be referred to hereinafter as upper shell 212. The second shell 214 may define a lower shell and be referred to hereinafter as lower shell 214. The pluggable body 130 includes the slots 152 defining the locating features configured to interact with the locating features 150 (shown in FIG. 2) of the receptacle assembly 104.

In an exemplary embodiment, the upper shell 212 is used for heat transfer from the internal circuit board 138. The upper shell 212 is placed in thermal communication with the internal circuit board 138. Heat generated by the internal circuit board 138 is drawn into the upper shell 212 and transferred therefrom. In an exemplary embodiment, the upper shell 212 includes a plurality of heat transfer fins or simply fins 220 extending therefrom. The fins 220 increase the surface area of the upper shell 212 and allow greater heat transfer from the upper shell 212. The fins 220 may extend from any portion of the upper shell 212. In various embodiments, the fins 220 extend from the top or first end 200 and are generally identified as end fins 222. In various embodiments, the fins 220 extend from the sides 204, 206 and are generally identified as side fins 224. Optionally, at least some side fins 224 may extend outward from end fins 222.

The fins 220 run lengthwise between the cable end 134 and the mating end 132. Optionally, the fins 220 may run substantially the entire length from the cable end 134 to the mating end 132. Optionally, the fins 220 may be recessed inward from the cable end 134 and/or the mating end 132. In the illustrated embodiment, the fins 220 are parallel plates that extend continuously between opposite ends of the fins 220. In alternative embodiments, other types of fins 220 may be used, such as fins 220 in the form of pins or posts extending from the pluggable body 130. The pins may be arranged in rows and columns and may be separated from each other to allow airflow around the pins and between the various pins.

The pluggable module 106 has a height or thickness 230 defined between the second end 202 and distal ends of the fins 220. The fins 220 increase the overall thickness 230 of the pluggable module 106 as compared to an un-finned pluggable module. Optionally, the fins 220 may comprise a substantial portion of the thickness 230. For example, the fins 220 may be greater than approximately 10% of the thickness 230. In some embodiments, the fins 220 may be greater than approximately 25% of the thickness 230. In other embodiments, the fins may be greater than approximately 50% of the thickness 230.

The fins 220 are separated by channels 240. Optionally, the channels 240 may have a uniform spacing between the fins 220. For example, sides of the fins 220 may be planar and parallel. The fins 220 and channels 240 may extend along the length of the pluggable body 130 such that the channels 240 are open at the cable end 134 and/or the mating end 132 to allow air to flow along the fins 220, such as from the cable end 134 toward the mating end 132 or from the mating end 132 toward the cable end 134. In various embodiments, the channels 240 may be shaped or contoured, such as to encourage airflow therethrough. In an exemplary embodiment, the channels 240 may receive portions of a thermal transport to encourage heat transfer from the pluggable body 130. In an exemplary embodiment, the upper shell 212 and/or the lower shell 214 is fabricated from a material having a high thermal conductivity.

Figure 6:
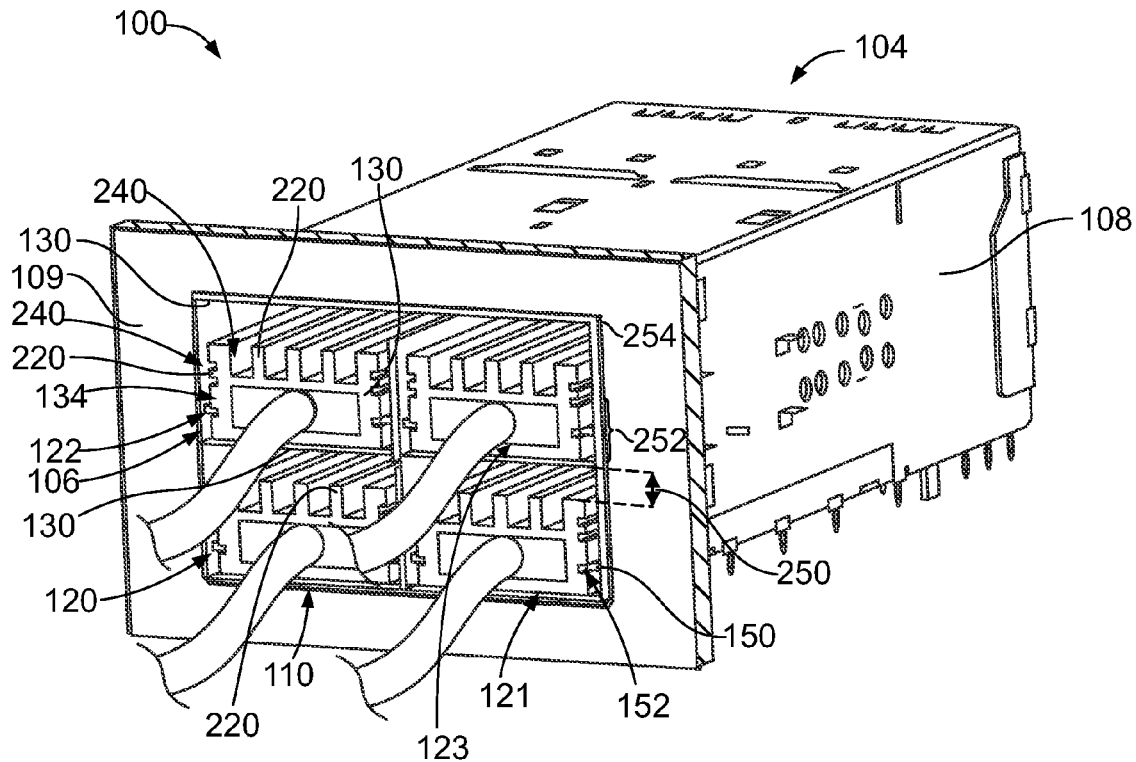
FIG. 6 is a front perspective view of the communication system showing the pluggable modules loaded in the receptacle assembly.

FIG. 6 is a front perspective view of the communication system 100 showing the pluggable modules 106 loaded in the receptacle assembly 104. The pluggable module 106 passes through an opening in the faceplate 109 to a position rearward of the faceplate 109 such that the pluggable module 106 is interior of or inside the device having the faceplate 109. In an exemplary embodiment, the faceplate 109 is conductive, such as a metal plate or bezel. The receptacle assembly 104 is electrically connected to the faceplate 109, such as using one or more gaskets. The electrical connection at the interface between the faceplate 109 and the receptacle housing 108 reduces EMI at the interface.

In an exemplary embodiment, the fins 220 are provided at the cable ends 134 of the pluggable bodies 130. For example, the fins 220 are provided at the front end 110 of the receptacle housing 108. The fins 220 are oriented such that the channels 240 are open to the external environment forward of the faceplate 109. The fins 220 are positioned along the pluggable body 130 such that the fins 220 are exposed at the port openings 121, 123 of the receptacle assembly 104. The fins 220 may extend from inside the receptacle assembly 104 to outside of the receptacle assembly 104, such as beyond the front end 110. The fins 220 may extend beyond or forward of the faceplate 109 in various embodiments. In alternative embodiments, the fins 220 may be recessed behind or rearward of the front end 110 and/or the faceplate 109, however the channels 240 are open to the exterior environment of the chassis forward of the faceplate 109. Having the fins 220 extend as such, relative to the cable ends 134, the faceplate 109 and the receptacle housing 108, allows the channels 240 to facilitate airflow between the internal environment and the external environment of the chassis. For example, air is able to flow through the channels 240 from inside the receptacle assembly 104, and is exhausted forward of the faceplate 109, which cools the fins 220 and the pluggable body 130. Alternatively, cool air is able to flow from outside of the receptacle assembly 104 through the channels 240 into the receptacle assembly 104 to cool the fins 220 and the pluggable body 130.

When the pluggable modules 106 are loaded in the receptacle assembly 104, a separation distance 250 is defined between the top wall 180 and the distal ends of the fins 220 of the finned pluggable module 106. The separation distance 250 may be minimal, such as less than 10% of the overall height of the contact modules 120, 122. The separation distance 250 defines a height of the open airflow channel above the pluggable module 106. The module cavity 120, 122 is divided into a module segment 252 and a heat transfer segment 254. The module segment 252 is generally the area where the pluggable body 130 of the pluggable module 106 is located. The heat transfer segment 254 is generally the area where heat transfer occurs. For example, the heat transfer segment 254 may be open to airflow or have the thermal transport element located therein. For example, air may be able to flow in the heat transfer segment 254 through the port 121 or 123 between the module cavity 120 or 122 and an exterior environment forward of the receptacle housing 108. In the illustrated embodiment, the module segment 252 is positioned below the heat transfer segment 254. In an exemplary embodiment, the module segment 252 occupies approximately the bottom two-thirds of the module cavity 120, 122 and the heat transfer segment 254 occupies approximately the top one-third of the module cavity 120, 122. The finned pluggable module 106 is received in the module cavity 120 or 122 such that the pluggable body 130 is located in the module segment 252 by the locating features 150. The heat transfer fins 220 are located in the heat transfer segment 254 when the finned pluggable module 106 is loaded into the module cavity 120 or 122.

Figure 7:
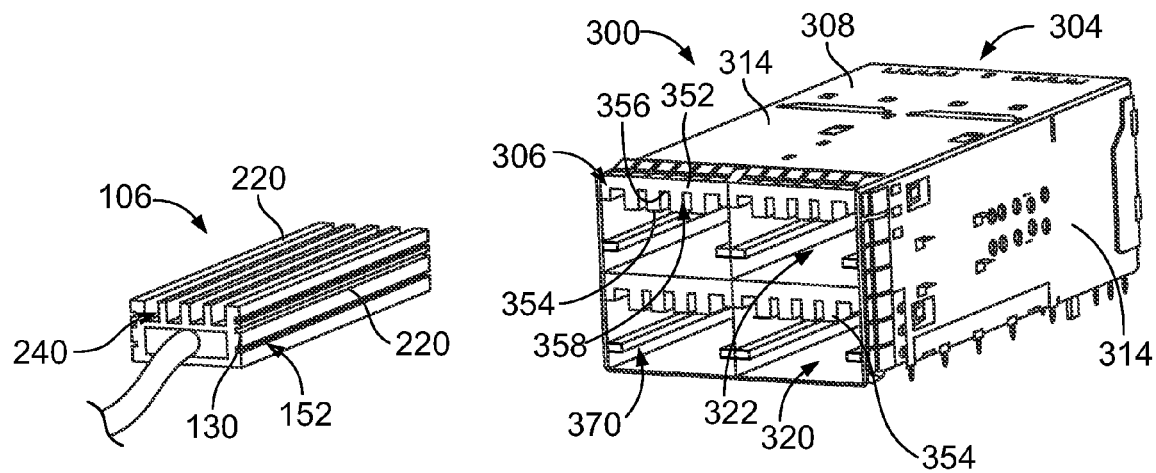
FIG. 7 is a front perspective view of the communication system showing thermal transports in the receptacle assembly in accordance with an exemplary embodiment.
Figure 8:
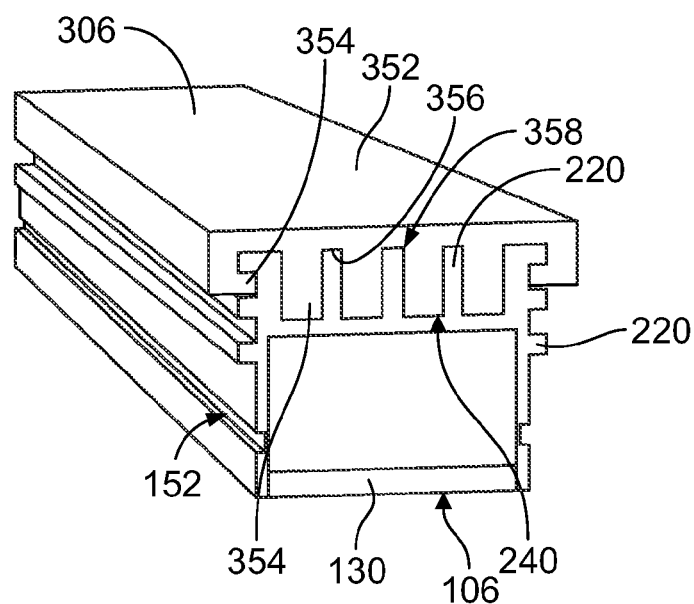
FIG. 8 is a front perspective view of a portion of the communication system showing one of the pluggable modules mated with the corresponding thermal transport shown in FIG. 7.

FIG. 7 is a front perspective view of a communication system 300 including a heat spreading receptacle assembly 304 with thermal transports 306. FIG. 8 is a front perspective view of a portion of the communication system 300 showing one of the pluggable modules 106 mated with the corresponding thermal transport 306. The receptacle housing 308 (shown in FIG. 7) is removed for clarity in FIG. 8 to illustrate the thermal transport 306. The communication system 300 is a variation of the communication system 10 utilizing the finned pluggable modules 106 with the heat spreading receptacle assembly 304. The receptacle assembly 304 includes the thermal transports 306 for transferring heat from the pluggable modules 106.

The thermal transports 306 are configured to be positioned in corresponding module cavities 320, 322. Each thermal transport 306 may be located along a top wall of the module cavity 320, 322; however other locations are possible in alternative embodiments. The thermal transport 306 may be an insert loaded into the receptacle housing 308. Alternatively, the thermal transport 306 may be integral with and defined by the various housing walls 314 of the receptacle housing 308. The thermal transport 306 is manufactured from a material having high thermal conductivity to facilitate transferring heat from the pluggable module 106. Heat may be dissipated by the thermal transport 306, such as into the surrounding environment, and/or the thermal transport 306 may transfer the heat to another structure, such as another heat sink or an integral heat sink remote from the pluggable module 106. In an exemplary embodiment, the thermal transport 306 is configured to be placed in thermal communication with the pluggable body 130 to transfer the heat therefrom.

The thermal transport 306 includes a body 352. In the illustrated embodiment, the body 352 is generally flat along the top wall; however the body 352 may have other shapes in alternative embodiments, such as being C-shaped extending along the sides in addition to the top wall. The thermal transport 306 includes a plurality of rails 354 extending inward from an interior surface 356 of the body 352. Grooves 358 are defined between the rails 354. The rails 354 and grooves 358 may have any shape; however, in an exemplary embodiment, the rails 354 and grooves 358 have a complementary shape to the finned pluggable body 130 configured to be received therein. For example, the rails 354 may be sized and shaped to be received in corresponding channels 240 of the pluggable body 130, and the grooves 358 may be sized and shaped to receive the fins 220. In various embodiments, the fins 220 engage the rails 354 to transfer heat from the pluggable body 130 into the rails 354 and the thermal transport 306.

Optionally, the rails 354 and grooves 358 may have lead-ins to guide loading of the pluggable module 106 into the thermal transport 306. For example, the rails 354 may be chamfered such that the grooves 358 are wider at the front end of the thermal transport 306. The thermal transport 306 receives the pluggable module 106 and guides loading of the pluggable module 106 into the receptacle housing 308. The thermal transport 306 may guide mating of the pluggable module 106 with the communication connector 142 (shown in FIG. 2). For example, the thermal transport 306 may include locating features, such as rails. Alternatively, the receptacle housing 308 may including locating features 370. For example, the locating features 370 may be flanges or rails extending into the module cavities 320, 322. Other types of locating features such as, but not limited to walls, tabs, wedges, keys, keyways, slots, grooves, spring beams and the like, may be used in alternative embodiments. The locating features 152 interact with the locating features 370 to locate the pluggable modules 106 in the module cavities 320, 322. For example, the slots 152 receive the locating features 370. In other various embodiments, the fins 220 may define the locating features 152 and the thermal transport 306 may define the locating features 370. For example, the rails 354 and grooves 356 may define the locating features 370 and the fins 220 may be received in the grooves 356 and by guided by the rails 354 to locate the pluggable module 106 in the module cavity 320, 322.

When the pluggable module 106 is loaded into the thermal transport 306, the pluggable body 130 is in thermal communication with the thermal transport 306 to transfer heat thereto. In such embodiments, rather than using convection cooling by airflow through the channels 240, such as occurs in the open airflow receptacle assembly, the pluggable body 130 is cooled by transferring heat into the thermal transport 306.

Figure 9:
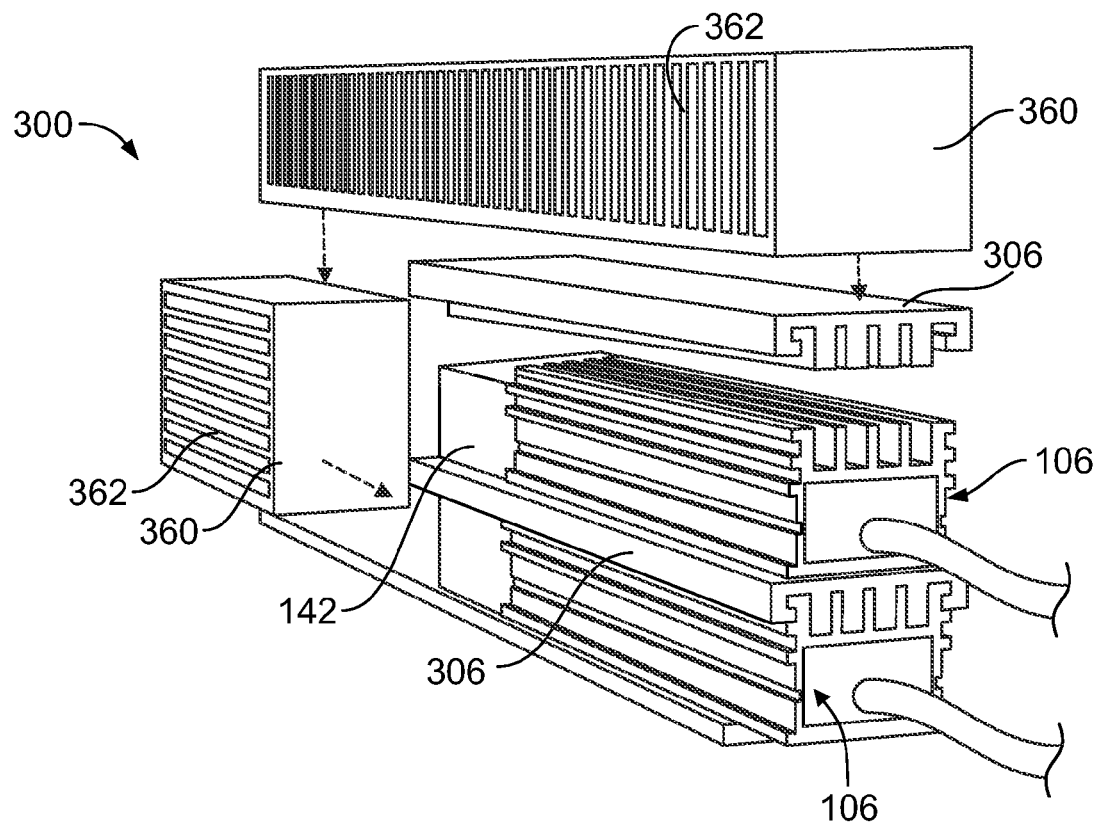
FIG. 9 is a partially exploded view of a portion of the communication system showing pluggable modules and corresponding thermal transports.

FIG. 9 is a partially exploded view of a portion of the communication system 300 showing pluggable modules 106 and corresponding thermal transports 306. The receptacle housing 308 (shown in FIG. 7) is removed for clarity in FIG. 9 to illustrate the thermal transports 306. The upper thermal transport 306 is shown removed from the upper pluggable module 106 to illustrate the pluggable module 106 mated with the corresponding communication connector 142. Optionally, the thermal transports 306 may be sized to receive the communication connectors 142 and may extend rearward of the communication connectors 142.

In an exemplary embodiment, the thermal transports 306 may transfer the heat away from the pluggable module 106. The thermal transports 306 may pipe or transfer the heat out of the receptacle housing 308, such as behind the receptacle housing 308, to another heat sink 360, such as a heat sink block located rearward of the receptacle housing 308, above the receptacle housing 308, or elsewhere. Optionally, the heat sink 360 may be integral with the thermal transport(s) 306. The heat sink 360 may have fins 362 or other features to efficiently transfer heat from the thermal transport 306. Optionally, air may flow through the heat sink 360 across the fins 362. Active cooling, such as via a fan or other cooling device, may be used to cool the thermal transports 306 and/or heat sink 360.

Figure 10:
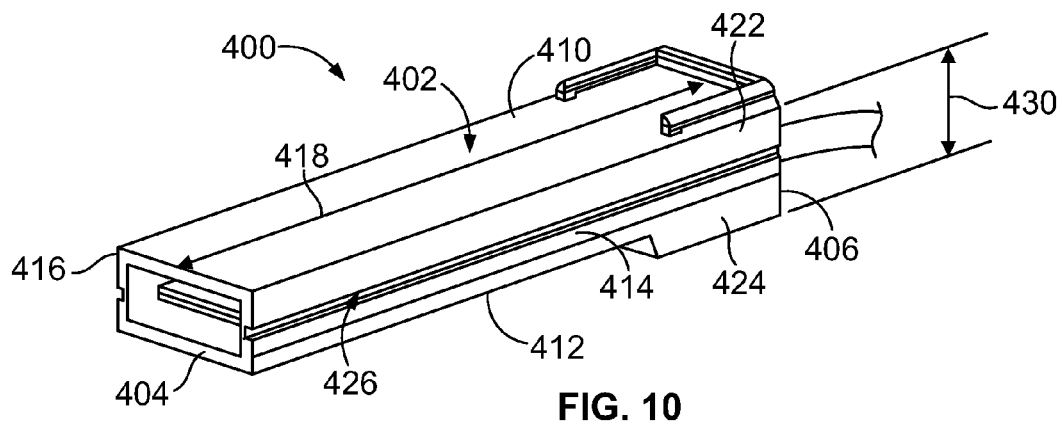
FIG. 10 is a front perspective view of a pluggable module in accordance with an exemplary embodiment.

FIG. 10 is a front perspective view of one of the un-finned pluggable modules 400 in accordance with an exemplary embodiment. The pluggable module 400 includes a pluggable body 402 holding an internal circuit board (not shown). The pluggable module 400 extends between a mating end 404 and a cable end 406. The pluggable body 402 has a first end or top end 410 and an opposite second end or bottom end 412 with sides 414, 416 extending between the first and second ends 410, 412. The first and second ends 410, 412 and the sides 414, 416 extend lengthwise along a length 418 of the pluggable body 402 between the mating end 404 and the cable end 406. Optionally, the internal circuit board may be exposed at the mating end 404 for mating with a corresponding communication connector, such as the communication connector 142 (shown in FIG. 2). Contrary to the pluggable body 130 (shown in FIG. 5), the pluggable body 402 does not include fins, but rather the top end 410 is generally smooth.

In an exemplary embodiment, the pluggable body 402 includes a first shell 422 and a second shell 424. Optionally, the first shell 422 may define an upper shell and may be referred to hereinafter as upper shell 422. The second shell 424 may define a lower shell and be referred to hereinafter as lower shell 424. The pluggable body 402 includes locating features 426 configured to interact with the locating features 150 (shown in FIG. 12) of the receptacle assembly 104. In the illustrated embodiment, the locating features 426 are slots and may be referred to hereinafter as slots 426. The slots 426 receive the locating features 150. Other types of locating features such as, but limited to rails, tabs, wedges, keys, keyways, spring beams and the like, may be used in alternative embodiments. For example, in other various embodiments, rather than slots, the locating features 426 may be beams or springs extending from the top end 410 that define the locating features 426. For example, the beams or springs may ride along or otherwise engage the top of the corresponding module cavity 120, 122 or 320, 322 or the thermal transport 306 (shown in FIG. 11) received in the module cavity 320, 322 to locate the pluggable module 400 in the module cavity 120, 122, 320, 322. In such embodiments, rather than having the rails 150 extending into the module cavities 120, 122, the separator plate or top housing wall at the top of the module cavity 120, 122, respectively, defines the locating features 150 or the thermal transports 306 at the tops of the module cavities 320, 322 define the locating features 370.

The pluggable module 400 has a height or thickness 430 defined between the first end 410 and the second end 412. Because the pluggable module 400 does not include fins, the overall thickness 430 of the pluggable module 400 is less as compared to the finned pluggable module 106.

Figure 11:
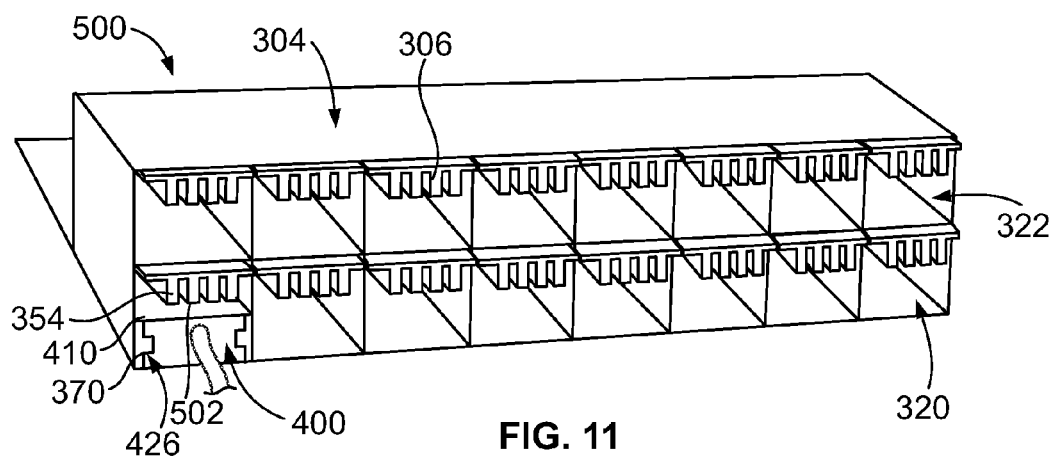
FIG. 11 is a front perspective view of a communication system in accordance with an exemplary embodiment.

FIG. 11 is a front perspective view of a communication system 500 showing one of the pluggable modules 400 loaded into the heat spreading receptacle assembly 304. The communication system 500 is a variation of the communication system 10 (FIG. 1) utilizing the un-finned pluggable modules 400 and heat spreading receptacle assembly 304. The thermal transports 306 are shown in the module cavities 320, 322 above the pluggable modules 400. Optionally, the thermal transports 306 may be in intimate thermal communication with the pluggable modules 400 to transfer heat from the pluggable modules 400. For example, distal ends 502 of the rails 354 may be in proximity to or be directly engaged with the top ends 410 of the pluggable modules 400. The thermal transports 306 are sized and shaped to allow the smaller, un-finned pluggable modules 400 to be loaded therein without obstructing loading into the module cavities 320, 322.

The locating features 370 interact with the locating features 426 to locate the pluggable modules 400 within the module cavities 320, 322. For example, the locating features 370 control the top-to-bottom position of the pluggable modules 400 within the module cavities 320, 322 to position the pluggable modules 400 for mating with the communication connector 142. Optionally, the pluggable modules 400 may be held near the bottoms with the thermal transports 306 near the tops of the module cavities 320, 322. The locating features 370 hold the pluggable modules 400 below the thermal transports 306 so the un-finned pluggable modules 400 may be loaded into the module cavities 320, 322 without obstruction.

Figure 12:
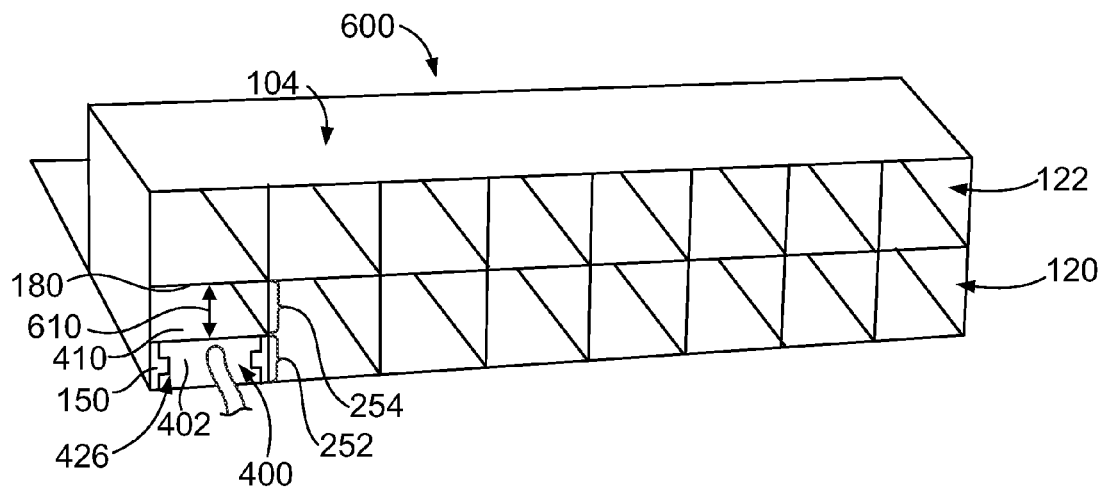
FIG. 12 is a front perspective view of a communication system in accordance with an exemplary embodiment.

FIG. 12 is a front perspective view of a communication system 600 showing one of the pluggable modules 400 loaded into the open airflow receptacle assembly 104. The module cavities 120, 122 are oversized creating an open airflow channel above the pluggable modules 400. The air in the open airflow channel cools the pluggable modules 400. When the pluggable modules 400 are loaded in the receptacle assembly 104, a separation distance 610 is defined between the top wall 180 and the top end 410 of the un-finned pluggable module 400. The separation distance 610 may be greater than the separation distance 250 (shown in FIG. 6). The separation distance 610 defines a height of the open airflow channel above the pluggable module 400.

When the un-finned pluggable module 400 is received in the module cavity 120 or 122, the pluggable body 402 is located in the module segment 252 by the locating features 150. The heat transfer segment 254 is open above the pluggable body 402 of the un-finned pluggable module 400 when the un-finned pluggable module 400 is loaded into the module cavity 120 or 122. The heat transfer segment 254 may define the separation distance 610.

The locating features 150 interact with the locating features 426 to locate the pluggable modules 400 within the module cavities 120, 122. For example, the locating features 150 control the top-to-bottom position of the pluggable modules 400 within the module cavities 120, 122 to position the pluggable modules 400 for mating with the communication connector 142.

With reference back to FIG. 1 and the various Figures described above, various embodiments of the subject matter herein include a set of receptacle assemblies 104, 304 including an open airflow receptacle assembly 104 and a heat spreading receptacle assembly 304. The open airflow receptacle assembly 104 has a first module cavity 120 defined by a top wall 176 and opposed side walls 182, 183 extending to a bottom 181 opposite the top wall 176. The first module cavity 120 has a first port 121 at a front end 110 thereof. The open airflow receptacle assembly 104 has a locating feature 150 in the module cavity 120. The open airflow receptacle assembly 104 has a first communication connector 142 positioned in the first module cavity 120. The heat spreading receptacle assembly 304 includes a second module cavity 322 defined by a top wall 380 and opposed side walls 382, 384 extending to a bottom 386 opposite the top wall 380. The second module cavity 322 has a second port 388 at a front end 390 thereof. The heat spreading receptacle assembly 304 has a locating feature 370 in the module cavity 322. The heat spreading receptacle assembly 304 has a second communication connector 142 positioned in the second module cavity 322. The heat spreading receptacle assembly 304 has a thermal transport 306 in the second module cavity 322 at the top wall 380 configured to dissipate heat. The first module cavity 120 is configured to selectively receive a finned pluggable module 106 having a plurality of heat transfer fins 220 extending therefrom and is configured to selectively receive an un-finned pluggable module 400. The communication connector 142 in the first module cavity 120 is selectively matable with both the finned pluggable module 106 and the un-finned pluggable module 400. The locating features 150 of the open airflow receptacle assembly 104 are configured to engage and locate both the finned pluggable module 106 and the un-finned pluggable module 400 depending on which of the finned pluggable module 106 or the un-finned pluggable module 400 is loaded into the first module cavity 120 such that the finned pluggable module 106 or the un-finned pluggable module 400 is located at the bottom 181 of the first module cavity 120. Air is configured to flow between the top wall 176 of the open airflow receptacle assembly 104 and the finned pluggable module 106 or the un-finned pluggable module 400. The second module cavity 322 is configured to selectively receive the finned pluggable module 106 and is configured to selectively receive the un-finned pluggable module 400. The communication connector 142 in the second module cavity 322 is selectively matable with both the finned pluggable module 106 and the un-finned pluggable module 400. The locating features 370 of the heat spreading receptacle assembly 304 are configured to engage and locate both the finned pluggable module 106 and the un-finned pluggable module 400 depending on which of the finned pluggable module 106 or the un-finned pluggable module 400 is loaded into the second module cavity 322 such that the finned pluggable module 106 or the un-finned pluggable module 400 is located at the bottom of the second module cavity 322. The heat transfer fins 220 of the finned pluggable module 106 are configured to be in intimate thermal communication with the thermal transport 306 such that the thermal transport 306 draws heat from the finned pluggable module 106 to cool the finned pluggable module 106. The un-finned pluggable module 400 fits in the second module cavity 322 below the thermal transport 306 when the un-finned pluggable module 400 is loaded into the second module cavity 322.

With reference back to FIG. 1 and the various Figures described above, various embodiments of the subject matter herein include a communication system 10 including a circuit board 14 having a mounting surface 15, an open airflow receptacle assembly 104, a heat spreading receptacle assembly 304, a finned pluggable module 106 and an un-finned pluggable module 400. The open airflow receptacle assembly 104 is configured to be mounted to the mounting surface 15 of the circuit board 14. The open airflow receptacle assembly 104 includes a first module cavity 120 defined by a top wall 176 and opposed side walls 182, 183 extending to a bottom 181 opposite the top wall 176. The first module cavity 120 has a first port 121 at a front end 110 thereof. The open airflow receptacle assembly 104 has a locating feature 150 in the module cavity 120. The open airflow receptacle assembly 104 has a first communication connector 142 positioned in the first module cavity 120. The heat spreading receptacle assembly 304 is configured to be mounted to the mounting surface 15 of the circuit board 14. The heat spreading receptacle assembly 304 includes a second module cavity 322 defined by a top wall 380 and opposed side walls 382, 384 extending to a bottom 386 opposite the top wall 380. The second module cavity 322 has a second port 388 at a front end 390 thereof. The heat spreading receptacle assembly 304 has a locating feature 370 in the module cavity 322. The heat spreading receptacle assembly 304 has a second communication connector 142 positioned in the second module cavity 322. The heat spreading receptacle assembly 304 has a thermal transport 306 in the second module cavity 322 at the top wall 380. The thermal transport 306 is configured to dissipate heat. The finned pluggable module 106 includes a finned pluggable body 130 extending between a mating end 132 and a cable end 134. The finned pluggable module 106 has an internal circuit board 138 exposed at the mating end 132. The finned pluggable body 130 has a first end 200 and an opposite second end 202 with sides 204, 206 extending therebetween along a length 208 of the pluggable body 130. The finned pluggable module 106 has a plurality of fins 220 extending outward from the first end 200. The un-finned pluggable module 400 includes a smooth pluggable body 402 extending between a mating end 404 and a cable end 406. The un-finned pluggable module 400 has an internal circuit board 138 exposed at the mating end 404. The un-finned pluggable body 402 has a first end 410 and an opposite second end 412 with sides 414, 416 extending therebetween along a length 418 of the pluggable body 402. The un-finned pluggable module 400 has a thickness 430 less than a thickness 230 of the finned pluggable module 106. The open airflow receptacle assembly 104 and the heat spreading receptacle assembly 304 are selectively mounted to the mounting surface 15 of the circuit board 14 such that a) one or more open airflow receptacle assembly 104 are mounted to the circuit board 14; b) one or more heat spreading receptacle assembly 304 are mounted to the circuit board 14; or c) at least one open airflow receptacle assembly 104 and at least one heat spreading receptacle assembly 304 are mounted to the circuit board 14. The open airflow receptacle assembly 104 is configured to selectively receive the finned pluggable module 106 and is configured to selectively receive the un-fined pluggable module 400. The heat spreading receptacle assembly 304 is configured to selectively receive the finned pluggable module 106 and is configured to selectively receive the un-fined pluggable module 400.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A receptacle assembly comprising:
a receptacle housing comprising a module cavity defined by a top wall and opposed side walls extending to a bottom opposite the top wall, the module cavity having a port at a front end of the receptacle housing, the receptacle housing having a locating feature in the module cavity; and
a communication connector positioned in the receptacle housing, the communication connector having a mating interface;
wherein the module cavity is sized and configured to selectively receive a finned pluggable module having a plurality of heat transfer fins extending therefrom and is configured to selectively receive an un-finned pluggable module having a thickness dimension that is less than a thickness dimension of the finned pluggable module, the mating interface of the communication connector being selectively matable with both the finned pluggable module and the un-finned pluggable module, the locating features being configured to engage and locate both the finned pluggable module and the un-finned pluggable module depending on which of the finned pluggable module or the un-finned pluggable module is loaded into the module cavity.

2. The receptacle assembly of claim 1, wherein the receptacle housing has a separation distance between the top wall and the finned pluggable module or the un-finned pluggable module, the separation distance being less when the finned pluggable module is loaded into the module cavity as compared to when the un-finned pluggable module is loaded into the module cavity.

3. The receptacle assembly of claim 1, wherein the module cavity includes a module segment and a heat transfer segment, the module segment occupying approximately the bottom two-thirds of the module cavity and the heat transfer segment occupying approximately the top one-third of the module cavity, the finned pluggable module comprising a pluggable body with the heat transfer fins extending from the pluggable body, the un-finned pluggable module comprising a pluggable body, wherein the pluggable body of the finned pluggable module or the un-finned pluggable module is located in the module segment by the locating features, and wherein the heat transfer fins are located in the heat transfer segment when the finned pluggable module is loaded into the module cavity, the heat transfer segment being open above the pluggable body of the un-finned pluggable module when the un-finned pluggable module is loaded into the module cavity.

4. The receptacle assembly of claim 3, wherein air is able to flow in the heat transfer segment through the port between the module cavity and an exterior environment forward of the receptacle housing.

5. The receptacle assembly of claim 1, wherein the module cavity is sized to allow either the finned pluggable module or the un-finned pluggable module to be loaded into the same module cavity.

6. The receptacle assembly of claim 1, wherein the locating features locate mating interfaces of the finned pluggable module and the un-finned pluggable module for mating engagement with the mating interface of the communication connector.

7. The receptacle assembly of claim 1, wherein the locating features comprise rails extending into the module cavity configured to be received in corresponding slots in the finned pluggable module or un-finned pluggable module depending on which of the finned pluggable module or the un-finned pluggable module is loaded into the module cavity.

8. The receptacle assembly of claim 1, further comprising a thermal transport in the module cavity along the top wall of the receptacle housing, the thermal transport configured for transporting heat from the finned pluggable module or from the un-finned pluggable module depending on which of the finned pluggable module or the un-finned pluggable module is loaded into the module cavity.

9. The receptacle assembly of claim 8, wherein the thermal transport includes a plurality of rails separated by grooves, the rails extending to distal ends, the rails being positioned between the corresponding heat transfer fins when the finned pluggable module is loaded into the module cavity, the distal ends being positioned above and facing the un-finned pluggable module when the un-finned pluggable module is loaded into the module cavity.

10. The receptacle assembly of claim 1, wherein the receptacle housing comprises a bottom wall at the bottom of the module cavity.

11. The receptacle assembly of claim 1, wherein the top wall and the side walls are metal walls providing electrical shielding.

12. A set of receptacle assemblies comprising:
an open airflow receptacle assembly comprising a first module cavity defined by a top wall and opposed side walls extending to a bottom opposite the top wall, the first module cavity having a first port at a front end thereof, the open airflow receptacle assembly having a locating feature in the module cavity, the open airflow receptacle assembly having a first communication connector positioned in the first module cavity; and
a heat spreading receptacle assembly comprising a second module cavity defined by a top wall and opposed side walls extending to a bottom opposite the top wall, the second module cavity having a second port at a front end thereof, the heat spreading receptacle assembly having a locating feature in the module cavity, the heat spreading receptacle assembly having a second communication connector positioned in the second module cavity, the heat spreading receptacle assembly having a thermal transport in the second module cavity at the top wall, the thermal transport configured to dissipate heat;
wherein the first module cavity is configured to selectively receive a finned pluggable module having a plurality of heat transfer fins extending therefrom and is configured to selectively receive an un-finned pluggable module, the communication connector in the first module cavity being selectively matable with both the finned pluggable module and the un-finned pluggable module, the locating features of the open airflow receptacle assembly being configured to engage and locate both the finned pluggable module and the un-finned pluggable module depending on which of the finned pluggable module or the un-finned pluggable module is loaded into the first module cavity such that the finned pluggable module or the un-finned pluggable module is located in the first module cavity, wherein air is configured to flow between the top wall of the open airflow receptacle assembly and the finned pluggable module or the un-finned pluggable module; and
wherein the second module cavity is configured to selectively receive the finned pluggable module and is configured to selectively receive the un-finned pluggable module, the communication connector in the second module cavity being selectively matable with both the finned pluggable module and the un-finned pluggable module, the locating features of the heat spreading receptacle assembly being configured to engage and locate both the finned pluggable module and the un-finned pluggable module depending on which of the finned pluggable module or the un-finned pluggable module is loaded into the second module cavity such that the finned pluggable module or the un-finned pluggable module is located in the second module cavity, wherein the heat transfer fins of the finned pluggable module are configured to be in intimate thermal communication with the thermal transport such that the thermal transport draws heat from the finned pluggable module to cool the finned pluggable module, and wherein the un-finned pluggable module fits in the second module cavity below the thermal transport when the un-finned pluggable module is loaded into the second module cavity.

13. The set of receptacle assemblies of claim 12, wherein the open airflow receptacle assembly has a separation distance between the top wall and the finned pluggable module or the un-finned pluggable module, the separation distance being less when the finned pluggable module is loaded into the first module cavity as compared to when the un-finned pluggable module is loaded into the first module cavity.

14. The set of receptacle assemblies of claim 12, wherein the first module cavity includes a module segment and a heat transfer segment, the module segment occupying approximately the bottom two-thirds of the first module cavity and the heat transfer segment occupying approximately the top one-third of the first module cavity, the finned pluggable module comprising a pluggable body with the heat transfer fins extending from the pluggable body, the un-finned pluggable module comprising a pluggable body, wherein the pluggable body of the finned pluggable module or the un-finned pluggable module is located in the module segment by the locating features, and wherein the heat transfer fins are located in the heat transfer segment when the finned pluggable module is loaded into the first module cavity, the heat transfer segment being open above the pluggable body of the un-finned pluggable module when the un-finned pluggable module is loaded into the first module cavity.

15. The set of receptacle assemblies of claim 14, wherein air is able to flow in the heat transfer segment through the first port between the first module cavity and an exterior environment forward of the receptacle assembly.

16. The set of receptacle assemblies of claim 12, wherein the first module cavity is sized to allow either the finned pluggable module or the un-finned pluggable module to be loaded into the first module cavity.

17. The set of receptacle assemblies of claim 12, wherein the locating feature of the open airflow receptacle assembly is similarly located relative to the bottom of the open airflow receptacle assembly as the locating feature of the heat transport receptacle assembly being located relative to the bottom of the heat transport receptacle assembly.

18. The set of receptacle assemblies of claim 12, wherein the locating features comprise rails extending into the first module cavity or the second module cavity, the rails being configured to be received in corresponding slots in the finned pluggable module or un-finned pluggable module depending on which of the finned pluggable module or the un-finned pluggable module is loaded into the first or second module cavities.

19. The set of receptacle assemblies of claim 12, wherein the thermal transport includes a plurality of rails separated by grooves, the rails extending to distal ends, the rails being positioned between the corresponding heat transfer fins when the finned pluggable module is loaded into the second module cavity, the distal ends being positioned above and facing the un-finned pluggable module when the un-finned pluggable module is loaded into the second module cavity.

20. A communication system comprising:
a circuit board having a mounting surface;
an open airflow receptacle assembly configured to be mounted to the mounting surface of the circuit board, the open airflow receptacle assembly comprising a first module cavity defined by a top wall and opposed side walls extending to a bottom opposite the top wall, the first module cavity having a first port at a front end thereof, the open airflow receptacle assembly having a locating feature in the module cavity, the open airflow receptacle assembly having a first communication connector positioned in the first module cavity; and
a heat spreading receptacle assembly configured to be mounted to the mounting surface of the circuit board, the heat spreading receptacle assembly comprising a second module cavity defined by a top wall and opposed side walls extending to a bottom opposite the top wall, the second module cavity having a second port at a front end thereof, the heat spreading receptacle assembly having a locating feature in the module cavity, the heat spreading receptacle assembly having a second communication connector positioned in the second module cavity, the heat spreading receptacle assembly having a thermal transport in the second module cavity at the top wall, the thermal transport configured to dissipate heat;
a finned pluggable module comprising a finned pluggable body extending between a mating end and a cable end, the finned pluggable module having an internal circuit board exposed at the mating end, the finned pluggable body having a first end and an opposite second end with sides extending therebetween along a length of the pluggable body, the finned pluggable module having a plurality of fins extending outward from the first end; and
an un-finned pluggable module comprising a smooth pluggable body extending between a mating end and a cable end, the un-finned pluggable module having an internal circuit board exposed at the mating end, the un-finned pluggable body having a first end and an opposite second end with sides extending therebetween along a length of the pluggable body, the un-finned pluggable module having a thickness thinner than a thickness of the finned pluggable module;
wherein the open airflow receptacle assembly and the heat spreading receptacle assembly are selectively mounted to the mounting surface of the circuit board such that a) one or more open airflow receptacle assembly are mounted to the circuit board; b) one or more heat spreading receptacle assembly are mounted to the circuit board; or c) at least one open airflow receptacle assembly and at least one heat spreading receptacle assembly are mounted to the circuit board; and
wherein the open airflow receptacle assembly is configured to selectively receive the finned pluggable module and is configured to selectively receive the un-fined pluggable module, and wherein the heat spreading receptacle assembly is configured to selectively receive the finned pluggable module and is configured to selectively receive the un-fined pluggable module.

* * * * *